V. C. KLOEPPER.
COMBINED SUPPORT AND GUARD.
APPLICATION FILED FEB. 28, 1920.
1,429,039.
Patented Sept. 12, 1922.
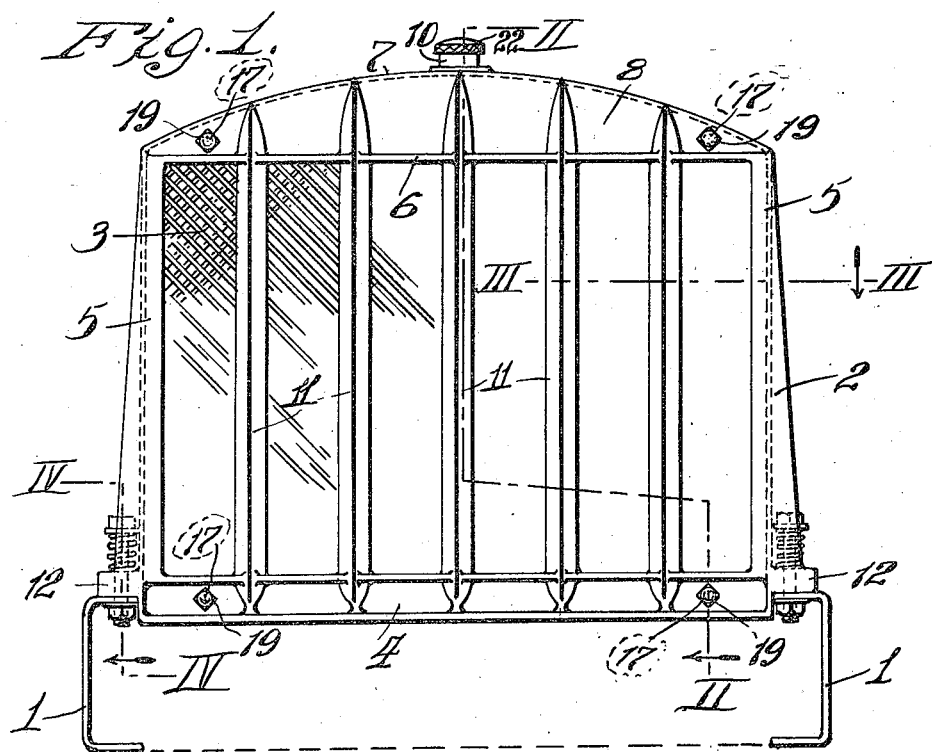
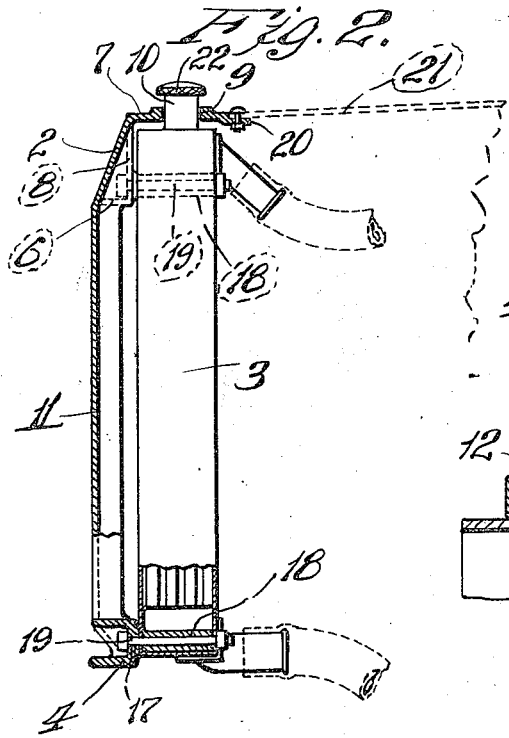
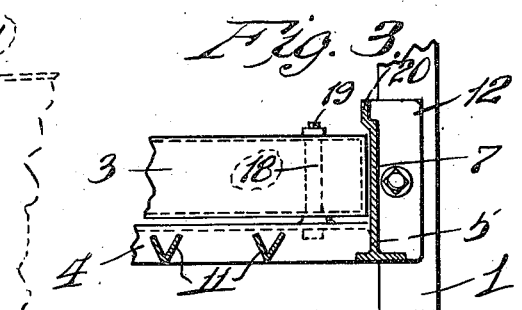
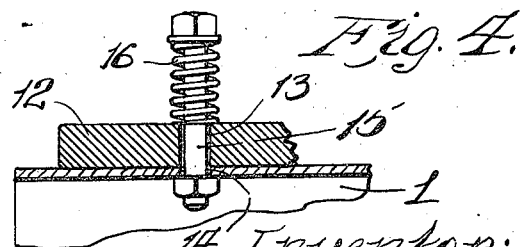
Inventor:
V. C. Kloepper.
By L. G. Fletcher atty.

Patented Sept. 12, 1922.

1,429,040

UNITED STATES PATENT OFFICE.

ALFRED M. LANE, OF ST. LOUIS, MISSOURI, ASSIGNOR TO MONARCH METAL PRODUCTS COMPANY, OF ST. LOUIS, MISSOURI, A CORPORATION OF MISSOURI.

SLOT CLOSURE.

Application filed January 13, 1921. Serial No. 437,052.

*To all whom it may concern:*

Be it known that I, ALFRED M. LANE, a citizen of the United States, and a resident of the city of St. Louis and State of Missouri, have invented a new and useful Improvement in Slot Closures, of which the following is a specification.

This invention relates to means for covering elongated openings and particularly to means for closing slots like those used in the floor of an automobile to accommodate the operating levers.

The present invention has for its principal objects to provide a cheap, simple, and efficient device for preventing cold air and dust from entering an automobile through the slots for the operating levers and which will not interfere with the operation of said levers, to provide for the installation of such device without removing the levers or floor boards, and to attain certain advantages which will hereinafter more fully appear.

The invention consists principally in the hereinafter described closure and in the arrangements and combinations of parts hereinafter described and claimed.

In the accompanying drawing, which forms part of this specification, and wherein like symbols refer to like parts wherever they occur.

Fig. 1 is a fragmentary vertical section through the floor of an automobile in the region of an operating lever, a slot closure embodying my invention being shown in connection therewith;

Fig. 2 is a plan view of the closure as it appears when the hand lever is in its forward position;

Fig. 3 is a vertical cross section on the line 3—3 in Fig. 2;

Fig. 4 is a view similar to Fig. 2, the movable cover plate being shown in the position it assumes when the hand lever is in neutral position;

Fig. 5 is a side elevation of the closure, the floor being shown in section and the position of the cover plate corresponding to the position shown in Fig. 4;

Fig. 6 is a vertical longitudinal section taken through the closure on the line 6—6 in Fig. 4; and Fig. 7 is a plan view of the two sections of the movable cover plate.

Fig. 8 is a plan view of the rear end of a slot closure provided with a modified form of cap member.

In said drawing, my invention is shown in connection with a control lever 8 of an automobile of well known make. The lower end of the control lever 8 is fixed to a horizontal shaft 9, and extends upwardly through an elongated slot 10 formed in the floor 11. Said lever is adapted to be moved in a horizontal direction and is in its rearmost position when the car is at rest and is in its forward position when the car is in motion.

The lever 8 is held in the desired position by means of a pawl 12, which is pivotally secured to the lever 8 below the floor 11 and engages a curved ratchet bar 13. The pawl is disengaged from the ratchet by means of a hand lever 14, which is pivotally secured to the upper end portion of the lever 8 and is connected to said pawl by means of a pull rod 15.

The closure shown in the accompanying drawing comprises two interlocking members A and B. The member A is formed of a plate or strip of sheet metal having elongated slot 16 formed therein of a size and shape corresponding to the size and shape of the slot 10 in the floor 11. The member A is slipped over the upper end of the operating lever 8 and is secured to the upper surface of the floor, with its slot 16 in register with the slot 10 of said floor, by means of screws 17.

Along each of the longitudinal side edges of the slot 16 the metal of the member A has an upwardly and outwardly extending hook or flange 18, that is, the metal is doubled over upon itself parallel with the body portion of said member A, but is spaced far enough thereabove to accommodate the downwardly and inwardly hooked or doubled under flanges 19 of the longitudinal side marginal portions of the cap member B, thus, the doubled over flanges 18 of the stationary member or base plate A form slideways upon which the movable cap member B moves.

The top or web portion of the cap B is provided with a slot 20 through which project the lever 8 and the pull rod 15, the slot being of a size and shape that will leave as small an opening as practicable between the edges of the slot and the lever and pull rod. The slot 20 is located adjaand in the event that it is desired to remove the radiator from encasement within the guard 2 after the bolts 19 and cap 22 of the radiator have been removed, the radiator can be lowered therefrom; the guard being left in its normal position and providing a support from the motor hood 21.

From the aforesaid description of this improved radiator guard and support, and since the radiator is eliminated from tortional strains of the vehicle frame, cooling radiators of this character can be provided of a simpler construction than heretofore in which the heretofore reinforcement thereof can be eliminated.

What I claim is:

1. The combination of a vehicle radiator and a guard therefor, said guard being arranged forwardly of said radiator and being provided with a plurality of integrally formed forwardly projecting portions drawing means for securing said radiator to said guard, and a horizontally extending bushing carried by said radiator for the reception of said drawing means.

2. The combination of a vehicle radiator and a guard member therefor, said member being arranged forwardly of said radiator and providing means for encasing said radiator and securing means cooperable with said radiator and said guard for demountably securing said radiator to said guard, comprised of a bushing carried by said radiator for the reception of a bolt carried by said guard.

3. In combination, a vehicle radiator provided with an opening for the reception of a horizontally extending securing member, a guard arranged forwardly thereof, a frame, and a motor hood, said guard adapted to support the forward part of said hood, a member extended from said guard into the opening of said radiator and secured therein and flexible means provided for securing said guard to said frame.

4. The combination of a radiator and a guard therefor, said radiator being provided with a plurality of horizontally extending openings, said guard having an opening formed in its upper portion for the reception of the filling neck of the radiator, and there being bolts carried by said guard each adapted to be engaged and secured in a respective opening of said radiator for supporting said radiator rearwardly from said guard.

5. The combination of a radiator, a guard for said radiator, and a frame for supporting said guard, said guard being comprised of a single supporting member which is arranged forwardly of said radiator and secured to said frame, and rearwardly extending means borne by said guard adapted to be inserted from the front of said guard for securing said radiator thereto.

V. C. KLOEPPER.

to be movable therewith, the metal along the side margin of the slot in said base plate and the side marginal edge portions of said cover plate being rebent substantially parallel with the body portion of said plates and slidably interlocked, said base plate having an upstanding flange adapted to close the space between said plates at one end thereof and said cover plate having a depending flange adapted to close the space between said plates at their opposite ends.

4. The combination with an automobile having a slot and a lever operating therein, of a base plate secured to said body and having a slot adapted to register with the slot for said lever, and a cover plate for said slot, said cover plate being adapted to embrace said lever so as to move therewith the metal along the side margins of the slot in said base plate being flanged upwardly and outwardly and the side marginal portions of said cover plate being flanged downwardly and inwardly, the downwardly and inwardly flanged margins of said cover plate being adapted to cooperate with the upwardly and outwardly flanged portions of said base plate, whereby said cover plate is slidably interlocked with said base plate.

Signed at St. Louis, Missouri, this 11th day of January, 1921.

ALFRED M. LANE.